US006842892B1

(12) United States Patent
Goldberg et al.

(10) Patent No.: US 6,842,892 B1
(45) Date of Patent: Jan. 11, 2005

(54) AUTOMATIC GENERATION OF AN OPTIMIZED API

(75) Inventors: Robert N. Goldberg, Emerald Hills, CA (US); Ludovic Champenois, Mountain View, CA (US); Syed Abbas, Sunnyvale, CA (US); Bruce Daniels, Capitola, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/571,069

(22) Filed: May 15, 2000

(51) Int. Cl.[7] .................... G06F 9/44
(52) U.S. Cl. .................... 717/108; 709/328
(58) Field of Search .................... 717/106–109, 717/120–122; 707/103 R; 709/310, 328, 204, 223; 703/17; 713/100

(56) References Cited

U.S. PATENT DOCUMENTS

| | | | | | |
|---|---|---|---|---|---|
| 5,546,584 | A | | 8/1996 | Lundin et al. | 709/315 |
| 5,675,805 | A | | 10/1997 | Boldo et al. | 717/114 |
| 5,748,974 | A | * | 5/1998 | Johnson | 707/103 R |
| 5,761,502 | A | * | 6/1998 | Jacobs | 717/109 |
| 5,875,332 | A | | 2/1999 | Wang et al. | 717/106 |
| 5,907,847 | A | | 5/1999 | Goldberg | 707/103 |
| 5,920,718 | A | * | 7/1999 | Uczekaj et al. | 709/315 |
| 5,931,919 | A | * | 8/1999 | Thomas et al. | 707/3 |
| 6,076,092 | A | | 6/2000 | Goldberg et al. | 707/103 |
| 6,134,545 | A | * | 10/2000 | Sadiq et al. | 717/115 |
| 6,173,290 | B1 | | 1/2001 | Goldberg | 701/103 |
| 6,182,277 | B1 | * | 1/2001 | DeGroot et al. | 707/100 |
| 6,230,157 | B1 | * | 5/2001 | Malcolm et al. | 703/17 |
| 6,285,976 | B1 | * | 9/2001 | Rotbart | 703/17 |
| 6,321,374 | B1 | * | 11/2001 | Choy | 717/106 |
| 6,341,371 | B1 | * | 1/2002 | Tandri | 717/158 |
| 6,557,100 | B1 | * | 4/2003 | Knutson | 713/100 |

FOREIGN PATENT DOCUMENTS

| | | | |
|---|---|---|---|
| EP | 0 595 661 | A1 | 5/1994 |
| WO | WO 99/65253 | A1 | 12/1999 |

* cited by examiner

*Primary Examiner*—Kakali Chaki
*Assistant Examiner*—Lawrence S.hrader
(74) *Attorney, Agent, or Firm*—Lahive & Cockfield, LLP

(57) ABSTRACT

An API optimizer generates an API (application program interface) customized to a particular process. The resulting optimized API includes API services that minimize network access. The API optimizer applies heuristic rules from a rules database to generate, on the basis of the application logic flow for that application and the set of objects, those services that minimize network access.

33 Claims, 9 Drawing Sheets

| Order: | 99-100432 | Order Date: | 03-Oct-99 |
|---|---|---|---|
| Cust Name: | John Jones | Cust #: | 00234 |
| Company: | United Widgets | Phone: | 555.555.5555 |
| Address: | 7 Widget Way, Redwood City, CA 94062 | | |

| ProductName | Description | Qty | Price | Total |
|---|---|---|---|---|
| Gear 1 | 002342 | 3 | $2.04 | $6.12 |
| Sprocket 33 | 000823 | 1 | $4.25 | $4.25 |

Order Total: $42.99

UPDATE

```
Public class LineItemOrderTotalsStruct implements java.io.Serializable {
   LineItemStruct lineItem;
   BigDecimal orderTotal;
}

   public class TotalsStruct implements java.io.Serializable }
      BigDecimal lineTotal;
      BigDecimal orderTotal;


pı   c class OrderStruct implements java.io.Serializable {
      int orderNumber;
      Date orderDate;
      Int customer_orders_custNumber;
      String companyName;
      String lName;
      String fName;
      String phone;
      String addressl;
      String adress2;
      String city;
      String state;
      String zip;
      LineItemStruct [ ]lineItems;
}

pı   c class LineItemStruct implements java.io.Serializable {
      int orderLine;
      String productName;
      String productDescription;
      BigDecimal unitPrice;
      int quantity;
      BigDecimal lineTotal;
}

      import javax.ejb.*;
      import java.rmi.*;
      import java.math.BigDecimal;

      public interface OrderEntry extends EJBObject {
         String [ ] [ ] getAllCustomerNames() throws RemoteException;
         void modifyCustomerName(String oldName, String newName) throws RemoteException;
         Integer [ ] getAllOrderIdsForCustomer(String fName, String lName)
                  throws RemoteException;
         OrderStruct getOrderByOrderId(int orderId) throws RemoteException;
         TotalsStruct updateLineItemQuantity(int orderNumber, int orderLine, int quantity)
                  throws RemoteException;
         LineItemOrderTotalsStruct newLineItem(int orderNumber, LineItemStruct li)
                  throws RemoteException;
         BigDecimal deleteLineItem(int orderNumber, int orderLine) throws RemoteException;


   }
```

- Program intialization:

```
Call method getAllCustomerNames ( ) and go to screen 1
```

- Screen 1:

```
String [ ] [ ] customerNames // ( scrolling list of
customers ) // user chooses a name
call method getAllOrderIdsForCustomerName ( fName,
1Name )
go to screen 2
```

- Screen 2:

```
String customerName // from selection on page 1
Integer [ ] orderIds // scrolling list of orderIds for
customer // user chooses an orderId
call method getOrderByOrderId (orderId)
go to screen 3
```

- Screen 3:

```
OrderStruct // master-detail for orderId chosen on
screen 2

if user edits customer name:
    call method modifyCustomerName (oldName, newName)
    go to screen 3
if user edits line item quantity on any line item:
    call method updateLineItemQuantity (orderId,
    orderLine, quan)
    go to screen 3
if user adds a new line item:
    call method newLineItem (orderId, lineItem)
    go to screen 3
if user deletes a line item:
    call method deleteLineItem (orderId, lineItem)
    go to screen 3
```

*Fig. 9*

AUTOMATIC GENERATION OF AN OPTIMIZED API

This invention relates to communication between processes, and in particular, to methods and systems for generating an Application Program Interface (API) optimized to a particular application program.

BACKGROUND

A typical conventional database system includes a database for holding data and a database management system (DBMS) for managing the database. The DBMS performs multiple management functions, including the regulation of access to the data contained within the database.

With the increasing popularity of the Internet, many conventional database systems have sought to provide access to clients over an Internet connection. Such database systems often work in conjunction with "application servers." An application server is a program situated between a client and a resource, such as a database, that handles operations between the client and the server resource. The application server may run programs that assist the client in gaining access to a database from a browser-based environment. Application programs running on client systems typically interact with applications running on the application server by making calls to methods defined in an application program interface (API). The API is a formalized set of methods that can be referenced by an application program to access services.

With conventional systems, designing an API is a difficult task. It is difficult for developers to decide which methods are to be included in an API. The API methods should be sufficiently general so that developers can readily employ them in a variety of customized applications. However, the developer faces a dilemma in that the developer does not know which applications will ultimately use the API. Consequently, the developer has little basis for designing an API that is customized for a given application program.

In the past, developers have addressed this problem by providing APIs in which generic services perform elementary operations that are usable in virtually any application program. In addition, developers have typically designed the API services so that there is little, if any, overlap in their functions. A disadvantage of this approach is that such APIs are "one-size-fits-all" APIs that are not tailored to the specific needs of any one application program.

In general, an API serves as a vehicle through which two separate processes can communicate. Consequently, each invocation of an API method generally requires interaction between processes. Where the interacting processes reside on the same physical machine, this interaction is unlikely to degrade system performance. However, in modern n-tiered systems, the interacting processes reside on different physical machines. Hence, each interaction between the two processes requires access to a network or other communication path between these two physical machines. This contributes to increased latency in the n-tiered system.

It is possible to design, by hand, an optimized API that minimizes the number of communications sent over a network. Unfortunately, this labor-intensive task requires that the developer be familiar with the logic flow for application programs that, in many cases, have yet to be written. Moreover, any changes to the logic flow of the application program may, depending on their extent, require corresponding changes in an API customized for that application program.

It is thus an object of the invention to overcome these disadvantages by providing a method and system for the automatic generation of an API optimized for a particular application.

SUMMARY

The disadvantages of the prior art are overcome by an API optimizer that automatically generates an API optimized for facilitating communication between a first process and a second process. The API optimizer includes a heuristic processor that interacts with a rules database, a specification of the application logic flow for the first process, and information regarding the objects to be manipulated or accessed by the first process. On the basis of rules stored in the rules database, the heuristic processor generates procedures tailored to the application logic flow so as to minimize the number of network interactions required for communication between the first and second processes.

The application logic flow can be viewed as a collection of states together with transitions between states. These states can be characterized by the display, modification, or usage of attributes or properties from objects selected from a set of objects stored in a database. As used herein, the term "object" includes business objects and entities.

Transitions between states are effected by services (e.g. functions or methods) operating on objects. The API optimizer includes, as part of the optimized API, services that cause transitions between two states with a minimum number of network accesses per transition. This minimum number is typically one but can sometimes be zero. Because each state can require several accesses to a database of object instantiations, the API optimizer may include a heuristic processor that examines the application logic flow for the process to identify the individual network accesses required to transition between two states. The API optimizer then generates computer-readable code that consolidates those network accesses into a single network access for effecting the transition between states. The resulting optimized API thereby effects transitions between states with a minimum number of network accesses.

In consolidating network accesses into a single API service, the heuristic processor applies heuristic rules stored in a rules database. For example, the heuristic processor can consolidate all retrievals or accesses of object attributes associated with one transition into a single API service associated with that transition. In addition, the heuristic processor may consolidate all modifications of object attributes associated with one transition into a single API service. The heuristic processor may also combine, into one API service, a modification of an object attribute associated with a first state and a retrieval of an object attribute associated with a second state.

There exist certain services that do not require network access for execution. The heuristic processor may optionally identify these services and generate computer-readable code for locally executing these services, thereby eliminating the network access that would otherwise occur.

The foregoing and other objects, features and advantages of the invention will be apparent from the following description and the accompanying drawings, in which:

BRIEF DESCRIPTION OF THE DRAWINGS

FIG. 8 shows the interface code for an API optimized for implementing transitions between the states shown in FIGS. 5–7; and FIG. 9 shows high level pseudo-code for an application program that implements the transitions of FIGS. 5–7 using the API interface code shown in FIG. 8.

DETAILED DESCRIPTION

An API optimizer consistent with the principles of the present invention generates an API having services customized for the application logic flow of a process. The procedures in such an optimized API are such that, when the process is run on a distributed database system, the application logic flow for the process is traversed with a minimum number of network interactions.

Figure 1:
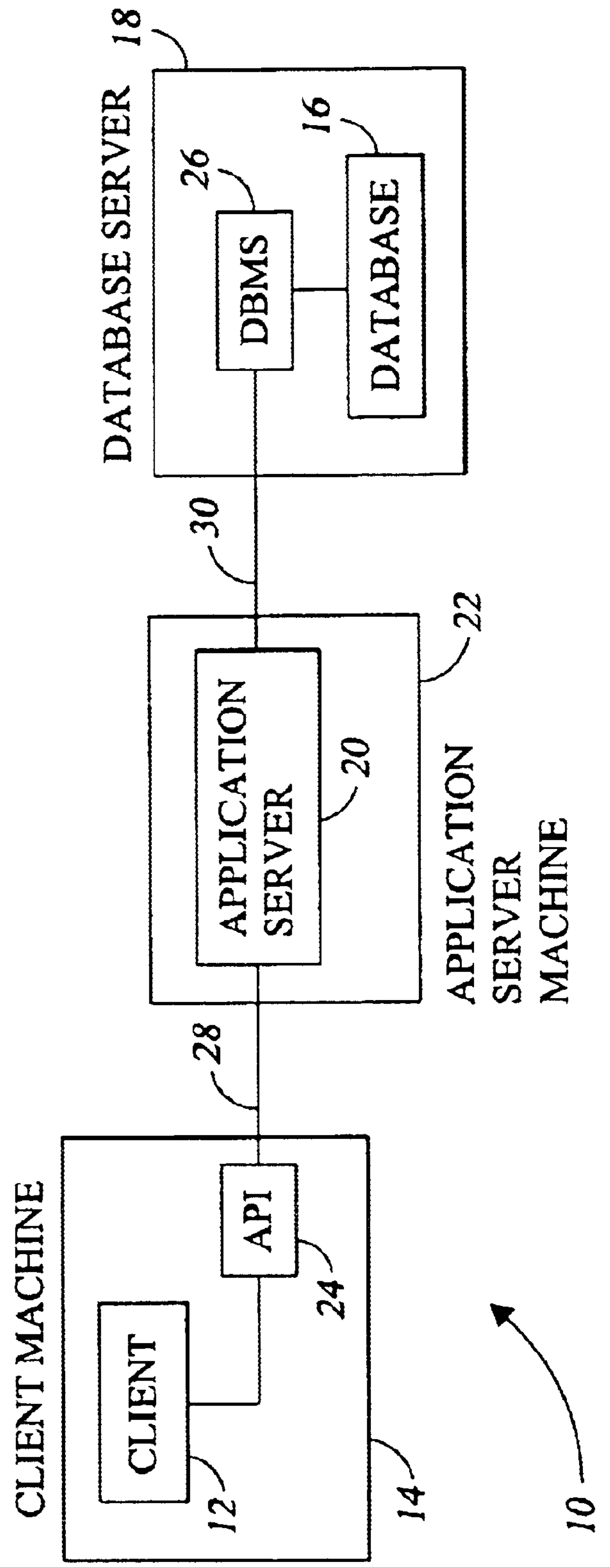
FIG. 1 is a distributed database system in which a client process uses an API optimized according to the principles of the present invention.

FIG. 1 shows one environment in which an illustrative embodiment of the present invention may be practiced. In particular FIG. 1, depicts a distributed database system 10 with a client process 12 (such as an application program) on a client machine 14 that accesses a database 16 stored on a database server 18. The communication between the client process 12 and the database 16 is accomplished by an application server 20, typically running on an application server machine 22. In response to instructions from an end-user, the client process 12 invokes selected services from an API 24. These selected API services enable the application server 20 to interact with a DBMS process 26 running on the database server 18. The result is that the DBMS process 26 accesses the database 16. Because the client process 12, the application server 20, and the DMBS 26 are separate processes and may run on separate physical machines, and because these machines are remote from one another, there exist first and second network links 28, 30 that enable communication between the client process, the application server, and the DMBS.

The first network link 28 may be a shared link on a global computer network. As a result, communication on this first network link 28 can be impeded by competing traffic. It is therefore desirable that the services available in the API 24 be designed so that communication between the client process 12 and the application server 20 is as infrequent as possible.

Those skilled in the art will appreciate that the configuration depicted in FIG. 1 is intended to be merely illustrative and not limiting of the present invention. The present invention need not be practiced with a database system. Generally, the present invention may be practiced wherever it is desirable to have an API that is optimized to an application program.

Figure 2:
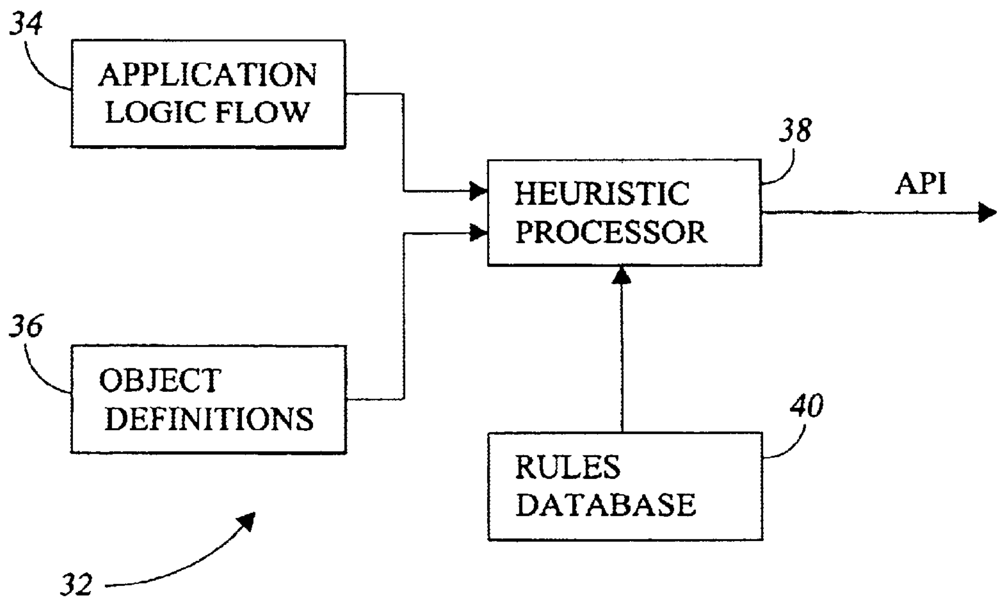
FIG. 2 is an API optimizer for creating the optimized API of FIG. 1.
Figure 3:
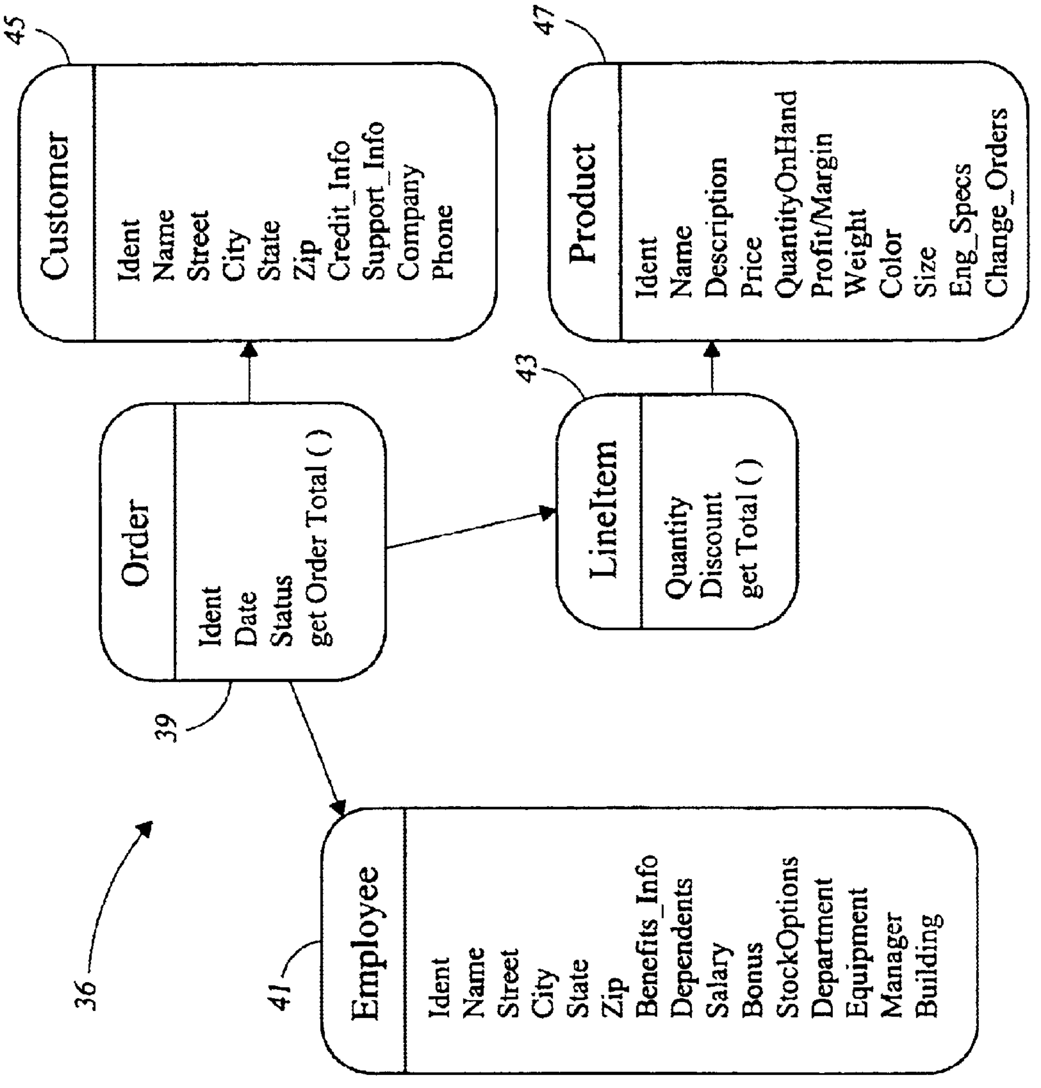
FIG. 3 is an exemplary set of objects, some of which include methods, to be accessed by the client process of FIG. 1.

FIG. 2 shows an API optimizer 32 for automatically generating an optimized API 24 (see FIG. 1) for a particular client process 12 (such as an application program) on the basis of a given application logic flow 34 for the client process and a set of objects (as will be described in more detail below). As shown in FIG. 2, the application logic flow 34 and object definitions 36 are provided to a heuristic processor 38. These object definitions 36 include information on the classes of objects that are to be manipulated by the client process 12. As shown in the representative collection of objects in FIG. 3, each object can have numerous "attributes and methods." For example, FIG. 3 shows an object called Order 39 representing a sales order. The Order object 39 has three attributes: Ident, Date, and Status. The collection of objects also includes a Customer object 45 for holding information regarding the customer that placed the order, a Line Item object 43 for identifying about particular items in the sales order and a Product object 47 for each product that is included in the order. The Product object 47 holds information regarding the ordered item. The Employee object 41 holds information regarding the employee that accepted the order. The arrows represent relationships between the objects. For example, the arrow between the Order object 39 and the Customer object 45 associates the order with a given customer (represented by the Customer object). For example, in FIG. 3, the Order objects 39 includes the method getOrderTotal( ) which retrieves the total cost of the order.

Figure 4:
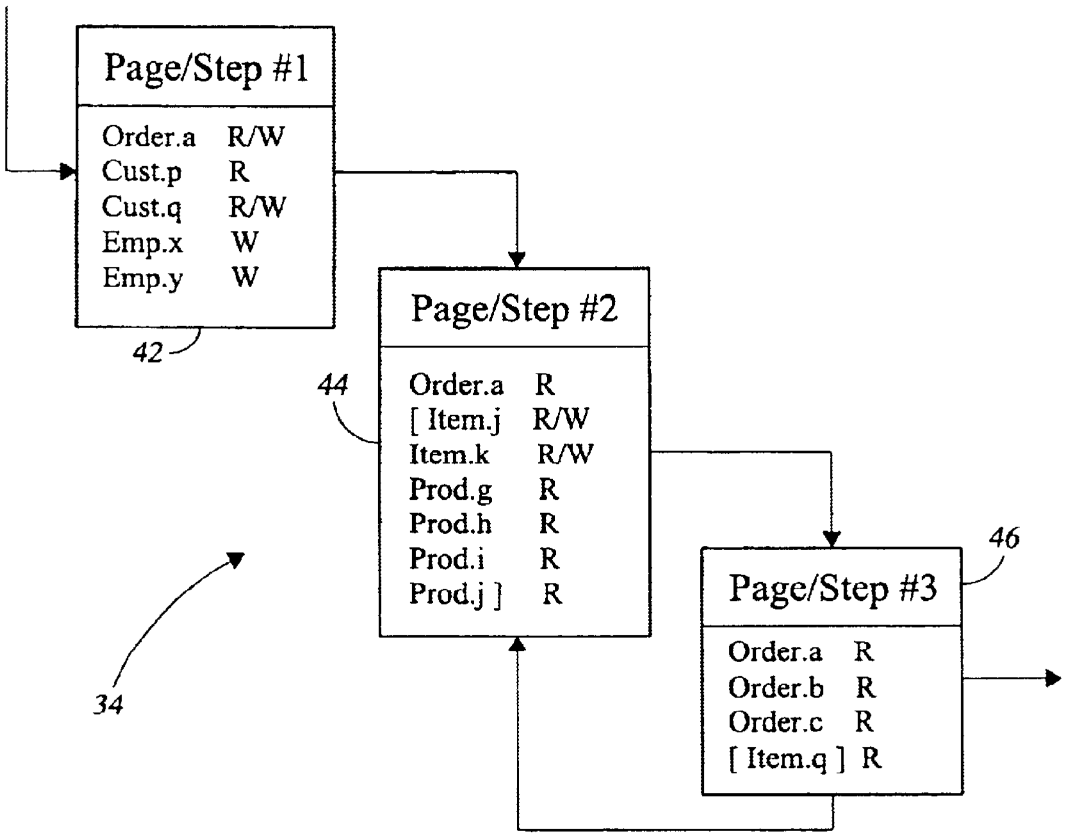
FIG. 4 is a state diagram illustrating the application logic flow of an exemplary client process.

The application logic flow 34 can be represented by a state diagram showing a collection of states together with transitions between states. FIG. 4 depicts an example state diagram. Such an application logic flow 34 can be represented in terms of a formal language. One suitable formal language is LOTOS.

In the example application logic flow 34 of FIG. 4, there are three states 42, 44 and 46, each of which requires access to instantiations of selected objects from the objects shown in FIG. 3. Each state might correspond, for example, to a single screen display visible to an end-user of the client process 12. Transitions between states are typically caused by a user-gesture (such as pressing a key, moving a mouse, etc.). To enhance the efficiency of the system 10, it is preferable that each user-gesture, and hence each transition between states, corresponds to as few network accesses as possible so as to minimize network traffic.

Unfortunately, the services (i.e., methods or functions) available in a conventional, non-optimized API are selected for their generality and their orthogonality to each other (i.e. to make certain that they do not overlap). These services are typically selected to perform elementary tasks that are adaptable for use by a variety of client processes. As a result, in a non-optimized API, a transition between two states generally requires that several API services be invoked. Since each invocation of an API service triggers a network access, each transition between two states potentially triggers multiple network communications events. Consequently, a client process that invokes services from a conventional, non-optimized API often results in a system in which each user-gesture precipitates several network communications events.

The API optimizer 32 automates the task of generating the API by providing both the application logic flow 34 and the object definitions 36 to the heuristic processor 38. The heuristic processor 38 then implements heuristic rules to generate an optimized API. These rules are provided in the rules database 40, which is in communication with the heuristic processor 38, as shown in FIG. 2.

To understand the nature of the heuristic rules provided in the rules database 40, it is useful to observe, from the application logic flow 34 illustrated in FIG. 4, that the client process 12 is expected to transition between a known number of states, each of which requires access to known objects and object attributes. An API optimized for a client process having the application logic flow 34 of FIG. 4 only needs services to effect the finite number of transitions between this finite number of states. The services provided in an optimized API 24 are, thus, those services that execute transitions. Any other services would be superfluous, since those services would never be used to transition from one state to another.

In the example of FIG. 4, an optimized API 24 needs a service to enter the first state 42, another service to effect transition between the first and second states 42, 44, two more services to toggle between the second and third states 44, 46, and potentially, an additional service for exiting the third state 46. The heuristic processor 38 generates an optimized API 24 by examining the application logic flow 34 and the object definitions 36 to create an API 24 having services that are necessary to effect the transitions between the three states 42, 44, 46 in the application logic flow 34. In generating the optimized API 24, the heuristic processor 38 implements heuristic rules stored in the rules database 40. Among these rules are the following:

(1) All accesses to an object's attributes that are necessary to effect a state transition should be merged into a single API service in the optimized API 24. Consequently, if, in order to effect a transition, it is necessary to retrieve several object attributes from the database 16, all the retrieval operations should be bundled into a single API service.

(2) All modifications to an object's attributes that are necessary to effect a state transition should also be merged into a single API service in the optimized API 24. Thus, if in order to effect a transition, it is necessary to modify several object attributes, all the modification operations should be carried out within a single API service.

(3) Only those attributes of an object that are to be referenced by the client process 12 need to be retrieved.

(4) All accesses to attributes of related objects that are necessary to effect a state transition should be merged into a single API service in the optimized API 24. This rule extends the first rule to cover the case of more than one object.

(5) All modifications to attributes of related objects that are necessary to effect a state transition should be merged into a single API service in the optimized API 24. This rule extends the rule (2) to cover the case of more than one object.

(6) The API service may include a method for providing access to attributes of follow on states from an initial state. An indication variable may identify the next state to transition to after the initial state. The data structure returned by the method is a type of variant record, with a variant for each follow on state.

(7) If a transition between states can be accomplished locally, then the instructions for effecting that transition should be incorporated into the optimized API 24.

Those skilled in the art will appreciate that these rules are intended to be merely illustrative and not limiting of the present invention. In some embodiments of the present invention, only a subset of these rules may be used. In other embodiments, a superset of rules that includes the above-itemized rules and additional rules may be used. In still other embodiments, an entirely different set of rules may be used.

Figure 5:
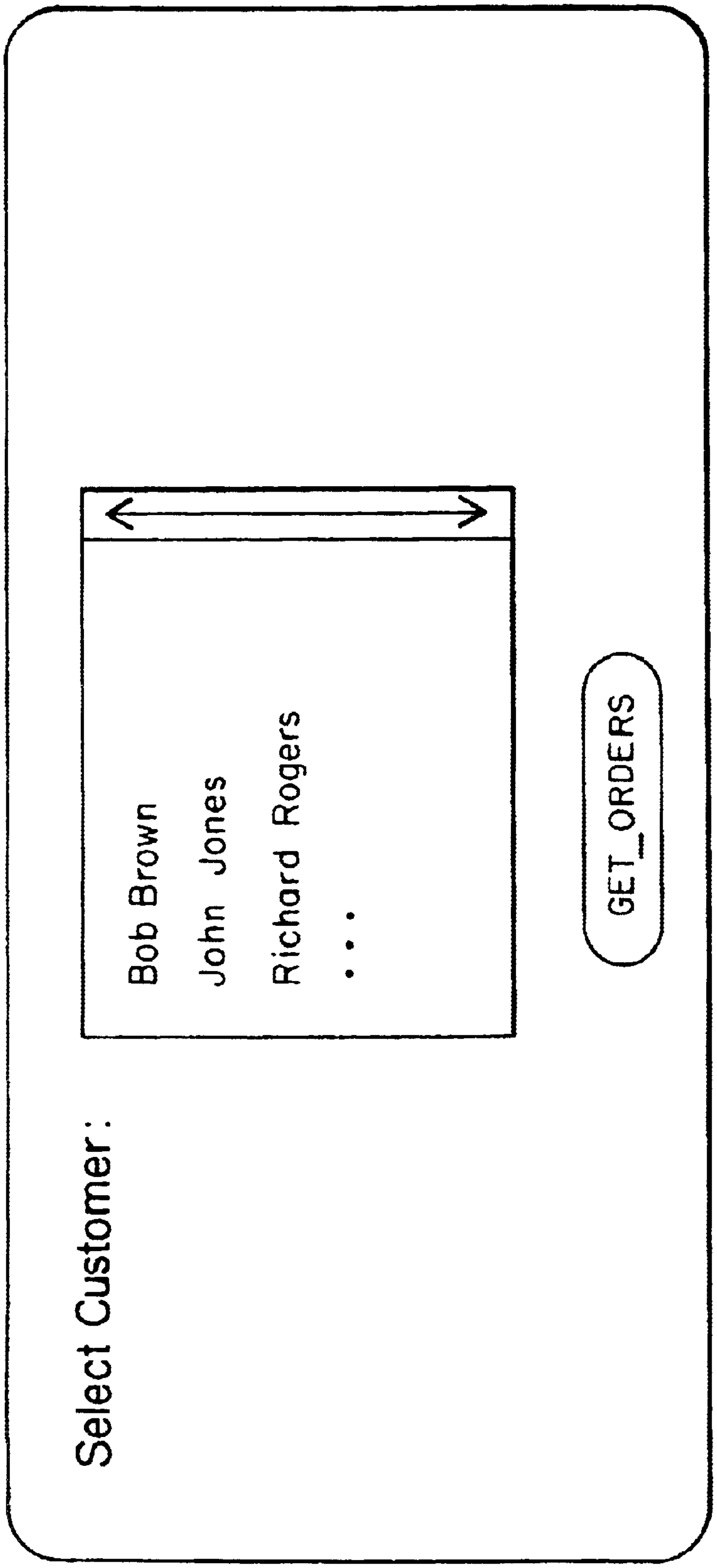
FIGS. 5–7 show three screens representing three states of the exemplary client process of FIG. 4.
Figure 6:
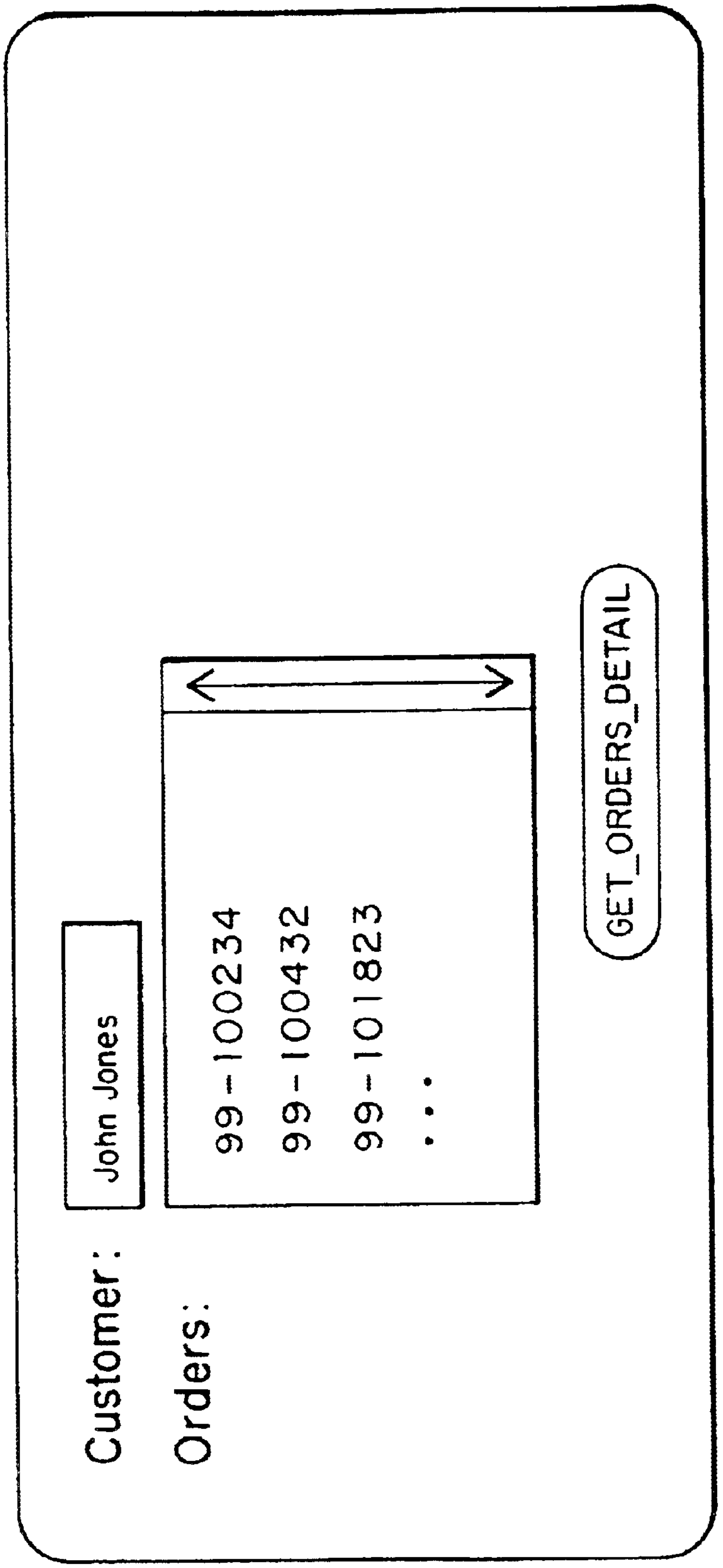
Figure 7:
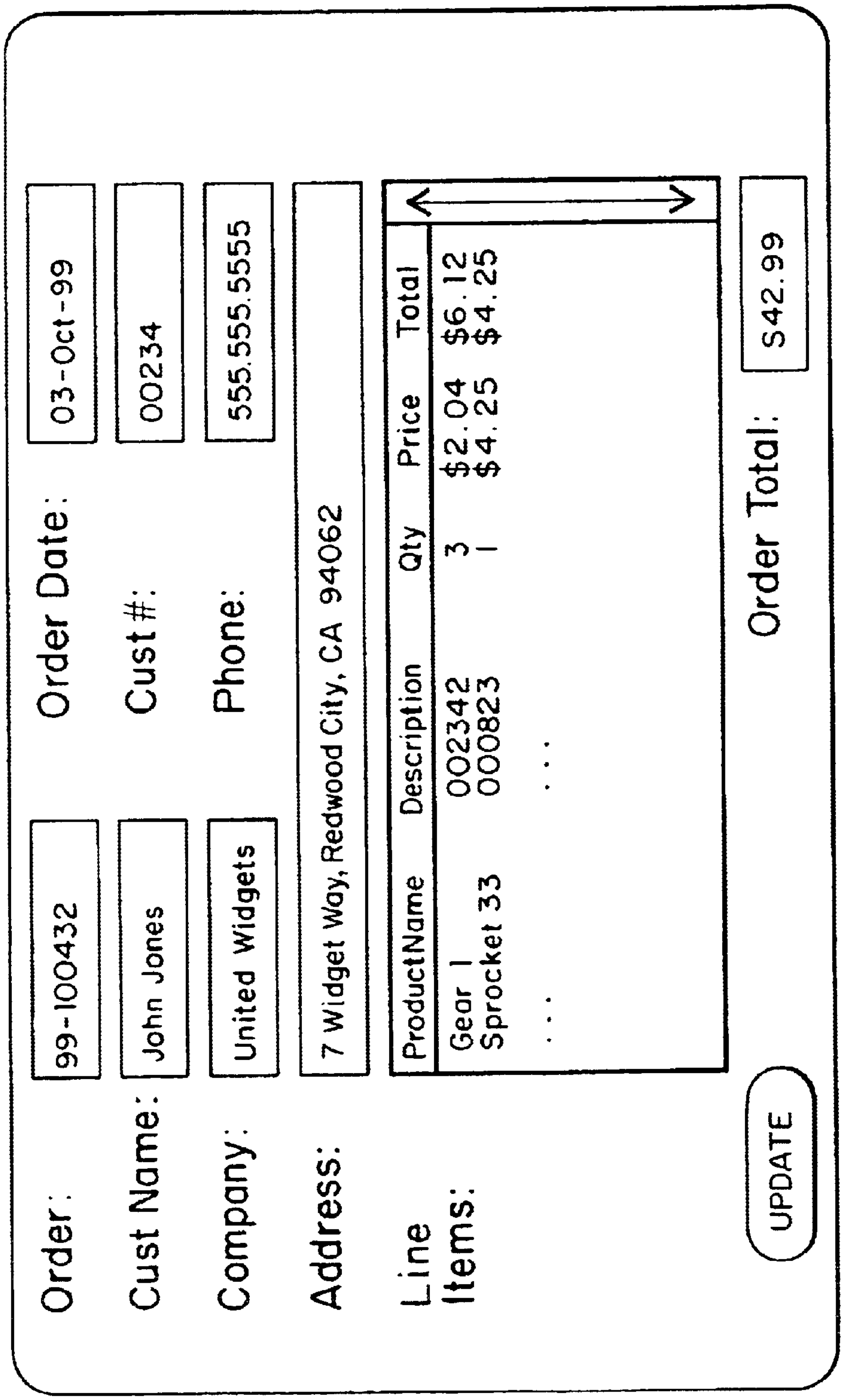

FIGS. 5–7 show three screens displayed by the client process 12. These screens represent three states in the application logic flow 34 of the client process 12. In this client process 12, an end-user who sees the customer list shown in FIG. 5 may highlight a particular customer name and click the GET__ORDERS button to view orders associated with that customer name. This user-gesture causes a transition from the first state (FIG. 5) to the second state (FIG. 6). Similarly, an end-user who views the order list of FIG. 6 can click on the GET__ORDER__DETAIL button to transition from the second state to a third state (FIG. 7). An optimized API 24 for this client process will include services for effecting transitions from the first to the second state and for placing the client process 12 in the first state.

Unlike the states shown in FIGS. 5 and 6, the user in the state shown in FIG. 7 can make modifications to selected object attributes. For example, the end-user can choose: to delete an order for an item, to order something new, or to order fewer or more of an item already on order. The optimized API 24 for this client process 12 should therefore include services for accomplishing each of these three tasks.

FIG. 8 shows code for interfacing with an optimized API 24 that implements the transitions shown in FIGS. 5–7. The optimized API 24 includes the following procedures:

getAllCustomerNames for placing the client process 12 into the first state;

getAllOrderIdsForCustomerName for transitioning between the first and second state;

getOrderByOrderId for transitioning from the second state to the third state;

newLineItem for adding a new line item object to the line item list in FIG. 7;

deleteLineItem for deleting an existing line item object from the line item list in FIG. 7;

updateLineItemQuantity for modifying the quantity attribute of a product object associated with a line item object in the line item list in FIG. 7;

modifyCustomerName for modifying the name attribute of a customer object in FIG. 7.

The heuristic processor 38 can be implemented as a process on a general purpose digital computer or on other electronic devices, including but not limited to Internet appliances, personal digital assistants (PDAs), and network computers. The heuristic processor 38 can be implemented as a sequence of conditional statements such that selected rules from the rules database 40 are applied upon the occurrence of selected conditions. The rules in the rules database 40 can be realized as software modules written in a conventional programming language and adapted for execution by the heuristic processor 38.

The service calls from the optimized API 24 shown in FIG. 8 are incorporated into the client process 12 in a manner suggested by the pseudo-code shown in FIG. 9. In operation, the client process 12 opens with the execution of the getAllCustomerNames API service. This places the system into its opening state, shown in FIG. 5. If the user clicks the GET__ORDERS button, the client process 12 executes the getAllOrderIdsForCustomerName API service to transition to the second state, shown in FIG. 6. If the user clicks the GET__ORDER__DETAIL button, the client process 12 executes the getOrderByOrderId API service to transition to the third state, shown in FIG. 7.

With the system in the third state, the user has the opportunity to make modifications to object attributes. In particular, when the user clicks the UPDATE button, the client process 12 checks to see what items in the display of FIG. 7 have been modified and invokes the appropriate API services (updateLineItemQuantity, modifyCustomerName, newLineItem, or deleteLineItem) for updating the object attributes corresponding to those items.

The services of the optimized API 24 are thus selected specifically to implement the transitions between states as dictated by the application logic flow 34 of the client process 12. As a result, each transition between states requires a minimum number of network accesses. Because the services are automatically generated by the heuristic processor 38, changes in the application logic flow 34 of the client process 12 can readily be accommodated by regenerating the optimized API 24.

As shown in FIG. 1, the DBMS process 26, the application server 20, and the client process 14 all reside on different machines. However, the subject matter of the appended claims in no way depends on the distributed nature of the system 10 shown in FIG. 1. The API optimizer 32 of the invention can just as readily generate an optimized API 24 for use in a system in which the client process 12, the application server 20, and the DBMS process 26 all reside on the same machine.

It will thus be seen that the illustrative embodiment of the present invention efficiently attains the objectives set forth above. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall therebetween.

Having described the invention, what we claim as new and secured by Letters Patent is:

1. A method implemented on a digital system for automatically generating an application program interface for a calling process, said method comprising the steps of:

providing a set of objects to be operated upon by said calling process, each of said objects having a set of object attributes, identifying an application logic flow for said calling process; and on the basis of said application logic flow and said object attributes, generating, with said digital system, computer-readable instructions for implementing said application program interface.

2. The method of claim 1 wherein said step of providing an application logic flow comprises the steps of:

defining a first state characterized by a first plurality of attributes selected from a first plurality of objects from said set of objects;

defining a second state characterized by a second plurality of attributes selected from a second plurality of objects from said set of objects; and defining a transition between said first state and said second state.

3. The method of claim 2 wherein said step of generating said instructions comprises the step of generating computer-readable code for effecting said transaction between said first state and said second state.

4. The method of claim 3 wherein said step of generating said instructions comprises the steps of:

identifying a sequence of accesses to said set of object attributes for transitioning from said first state to said second state;

generating computer-readable code for effecting said sequence of accesses; and incorporating said computer-readable code into said application program interface.

5. The method of claim 3 wherein said step of generating said instructions comprises the steps of:

identifying a sequence of modifications to said set of object attributes for transitioning between said first state and said second state;

generating computer-readable code for effecting said sequence of modifications; and incorporating said computer-readable code into said application program interface.

6. The method of claim 3 wherein said step of generating said instructions comprises the steps of:

identifying said second plurality of attributes to be displayed in transitioning from said first state to said second state;

generating computer-readable code for displaying said second plurality of attributes; and incorporating said computer-readable code into said application program interface.

7. The method of claim 4 wherein said step of identifying a sequence of accesses comprises the steps of:

identifying a first object whose attributes are to be accessed;

identifying a second object whose attributes are to be accessed; and defining said sequence of accesses to include access to said attributes of said first object and accesses to said attributes of said second object.

8. The method of claim 5 wherein said step of identifying a sequence of modifications comprises the steps of:

identifying a first object whose attributes are to be modified;

identifying a second object whose attributes are to be modified; and defining said sequence of modifications to include modifications to said attributes of said first object and modifications to said attributes of said second object.

9. The method of claim 6 wherein said step of identifying said second plurality of attributes to be displayed comprises the steps of:

identifying a first object whose attributes are to be displayed;

identifying a second object whose attributes are to be displayed; and defining said second plurality of attributes to include selected attributes of said first object and selected attributes of said second object.

10. The method of claim 3 wherein said step of generating said instructions comprises the steps of:

identifying a modification of an object attribute associated with said first state;

identifying an access of an object attribute associated with said second state;

generating computer-readable code for executing said modification and said access; and incorporating said computer-readable code into said application program interface.

11. The method of claim 3 wherein said step of generating said instructions comprises the steps of:

identifying a locally executable processing step;

generating computer-readable code for effecting said locally executable processing step; and incorporating said computer-readable code into said application program interface.

12. A system for automatically generating an application program interface for a calling process, said system comprising:

means for identifying a set of objects to be operated upon by said calling process, each of said objects having a set of object attributes;

means for determining an application logic flow for said calling process;

an heuristic processor interacting with a rules database, a specification of said identified application logic flow for said calling process, and information regarding said identified objects to be operated on by said calling process, said heuristic processor generating procedures tailored for said application logic flow of the calling process; and means for generating, on the basis of said application logic flow, said generated procedures, and said object attributes, computer-readable instructions for generating said application program interface.

13. The system of claim 12 wherein said means for determining an application logic flow comprises:

means for defining a first state characterized by a display of a first plurality of attributes selected from a first plurality of objects from said set of objects;

mean for defining a second state characterized by a display of a second plurality of attribute selected from a second plurality of objects from said set of objects; and means for defining a transition between said first state and said second state.

14. The method of claim 13 wherein said means for generating said instructions comprises:

means for generating computer-readable code for effecting said transition between said first state and said second state.

15. The system of claim 14 wherein said means for defining a generating said instructions comprises:

means for identifying a sequence of accesses to said set of object attributes for transitioning from said first state to said second state;

means for generating computer-readable code for effecting said sequence of accesses; and means for incorporating said computer-readable code into said procedure.

16. The system of claim 15 wherein said means for generating said instructions comprises:

means for identifying a sequence of modifications to said set of object attributes for transitioning between said first state and said second state;

means for generating computer-readable code for effecting said sequence of modifications; and means for incorporating said computer-readable code into said procedure.

17. The system of claim 14 wherein said means for generating said instructions comprises:

means for identifying said second plurality of attributes to be displayed in transitioning from said first state to said second state;

means for generating computer-readable code for displaying said second plurality of attributes; and means for incorporating said computer-readable code into said application program interface.

18. The system of claim 15 wherein said means for identifying a sequence of accesses comprises:

means for identifying a first object whose attributes are to be accessed;

means for identifying a second object whose attributes are to be accessed; and means for identifying said sequence of accesses to include access to said attributes of said first object and accesses to said attributes of said second object.

19. The system of claim 16 wherein said means for identifying a sequence of modifications comprises:

means for identifying a first object whose attributes are to be modified;

means for identifying a second object whose attributes are to be modified; and means for defining said sequence of modifications to include modifications to said attributes of said first object and modifications to said attributes of said second object.

20. The system of claim 17 wherein said means for identifying said second plurality of attributes to be displayed comprises:

means for identifying a first object whose attributes are to be displayed;

means for identifying a second object whose attributes are to be displayed; and means for defining said second plurality of attributes to include selected attributes of said first object and selected attributes of said second object.

21. The system of claim 14 wherein said means for generating said instructions comprises:

means for identifying a modification of an object attribute associated with said first state;

means for identifying an access of an object attribute associated with said second state;

means for generating computer-readable code executing said modification and said access; and means for incorporating said computer-readable code into said application program interface.

22. The system of claim 14 wherein said means for generating said instructions comprises:

means for identifying a locally executable processing step;

means for generating computer-readable code for executing said locally executable processing step; and means for incorporating said computer-readable code into said application program interface.

23. A computer-readable medium having encoded thereon software for automatically generating an application program interface for a calling process, said software including instructions for executing the steps of:

providing a set of objects to be operated upon by said calling process, each of said object having a set of object attributes;

identifying an application logic flow for said calling process; and on the basis of said application logic flow and said object attributes, generating computer-readable instructions for incorporation into said application program interface.

24. The computer-readable medium of claim 23 wherein said instructions for executing the step of providing an application logic flow comprise instructions for executing the steps of:

defining a first state characterized by a display of a first plurality of attributes selected from a first plurality of objects from said set of objects;

defining a second state characterized by a display of a second plurality of attributes selected from a second plurality of objects from said set of objects; and defining a transition between said first state and said second state.

25. The computer-readable medium of claim 24 wherein said instructions for executing the step of generating said instructions comprise instructions for executing the step of generating computer-readable code for effecting said transition between said first and said second state.

26. The computer-readable medium of claim 25 wherein said instructions for executing the step of generating said instructions comprise instructions for executing the steps of:

identifying a sequence of accesses to said set of object attributes for transitioning from said first state to said second state;

generating computer-readable code for effecting said sequence of accesses; and incorporating said computer-readable code into said application program interface.

27. The computer-readable medium of claim 25 wherein said instructions for executing the step of generating said instructions comprise instructions for executing the steps of:

identifying a sequence of modifications to said set of object attributes for transitioning between said first state and said second state;

generating computer-readable code into said sequence of modifications; and incorporating said computer-readable code into said application program interface.

28. The computer-readable medium of claim 25 wherein said instructions for executing the step of generating said instructions comprise instructions for executing the steps of:

identifying said second plurality of attributes to be displayed in transitioning from said first state to said second state;

generating computer-readable code for displaying said second plurality of attributes; and incorporating said computer-readable code into said application program interface.

29. The computer-readable medium of claim 26 wherein said instructions for executing the step of identifying a sequence of accesses comprise instructions for executing the steps of:

identifying a first object whose attributes are to be accessed;

identifying a second object whose attributes are to be accessed; and defining said sequence of accesses to include access to said attributes of said first object and accesses to said attribute of said second object.

30. The computer-readable medium of claim 27 wherein said instructions for executing the step of identifying a sequence of modifications comprise instructions for executing the steps of:

identifying a first object whose attributes are to be modified;

identifying a second object whose attributes are to be modified; and defining said sequence of modification to include modifications to said attributes of said first object and modifications to said attributes of said second object.

31. The computer-readable medium of claim 28 wherein said instructions for executing the step of identifying said second plurality of attributes to be displayed comprise instructions for executing the steps of:

identifying a first object whose attributes are to be displayed;

identifying a second object whose attributes are to be displayed;

defining said second plurality of attributes to include selected attributes of said first object and selected attributes of said second object.

32. The computer-readable medium of claim 25 wherein said instructions for executing the step of generating said instructions comprise instructions for executing the steps of:

identifying a modification of an object attribute associated with said first state;

identifying an access of an object attribute associated with said second state;

generating computer-readable code for executing said modification and said access; and incorporating said computer-readable code into said application program interface.

33. The computer-readable medium of claim 25 wherein said instructions for executing the step of generating said instructions comprise instructions for executing the steps of:

identifying a locally executable processing step;

generating computer-readable code for effecting said locally executable processing step; and incorporating said computer-readable code into said application program interface.

* * * * *